(12) United States Patent
Aerts et al.

(10) Patent No.: US 10,194,157 B2
(45) Date of Patent: Jan. 29, 2019

(54) ENCODER, DECODER, SYSTEM AND METHODS FOR VIDEO CODING

(71) Applicant: Alcatel Lucent, Boulogne Billancourt (FR)

(72) Inventors: Maarten Aerts, Beveren (BE); Patrice Rondao Alface, Chapelle-lez-Herlaimont (BE)

(73) Assignee: Alcatel Lucent, Boulogne-Billancourt (FR)

( * ) Notice: Subject to any disclaimer, the term of this patent is extended or adjusted under 35 U.S.C. 154(b) by 62 days.

(21) Appl. No.: 15/212,365

(22) Filed: Jul. 18, 2016

(65) Prior Publication Data

US 2017/0026656 A1    Jan. 26, 2017

(30) Foreign Application Priority Data

Jul. 24, 2015  (EP) .................................... 15306208

(51) Int. Cl.
| | |
|---|---|
| *H04N 19/36* | (2014.01) |
| *H04N 19/23* | (2014.01) |
| *H04N 19/17* | (2014.01) |
| *H04N 19/119* | (2014.01) |
| *H04N 19/154* | (2014.01) |
| *H04N 19/20* | (2014.01) |

(52) U.S. Cl.
CPC .......... *H04N 19/23* (2014.11); *H04N 19/119* (2014.11); *H04N 19/154* (2014.11); *H04N 19/17* (2014.11); *H04N 19/20* (2014.11)

(58) Field of Classification Search
CPC .... H04N 19/23; H04N 19/119; H04N 19/154; H04N 19/17; H04N 19/20
USPC ..................................................... 375/240.02
See application file for complete search history.

(56) References Cited

U.S. PATENT DOCUMENTS

2006/0262846 A1    11/2006  Burazerovic et al.

FOREIGN PATENT DOCUMENTS

JP      H 11 027682      1/1990

OTHER PUBLICATIONS

Salembier, Philippe, et al., "Region-Based Video Coding Using Mathematical Morphology", Proceedings of the IEEE, vol. 83, No. 6, Jun. 1995, pp. 843-857.

(Continued)

*Primary Examiner* — Nguyen T Truong
(74) *Attorney, Agent, or Firm* — Fay Sharpe LLP (57) ABSTRACT

An encoder for encoding a video signal, comprising a video modelling module configured for determining a plurality of video modelling parameters for a plurality of video locations on a spatiotemporal grid of said video signal, said spatiotemporal grid comprising at least two spatial dimensions and a time dimension, each video modelling parameter being adapted for allowing a pre-determined video model to at least approximately reconstruct its video location, a video segmentation module configured for segmenting said video signal into a plurality of spatiotemporal video regions, based on said video modelling parameters and a vectorisation module configured for vectorising spatiotemporal surfaces of said spatiotemporal video regions; and wherein said encoder is configured for encoding said video signal based on at least a subset of said determined plurality of video modelling parameters and based on said vectorised spatiotemporal surfaces, wherein said subset is determined taking into account said spatiotemporal video regions.

20 Claims, 1 Drawing Sheet

(56) References Cited

OTHER PUBLICATIONS

Doretto, Gianfranco, et al., "Dynamic Texture Segmentation", Dept. of Computer Science, UCLA Los Angeles, CA.
Fengqing Zhu et al., "Spatial and Temporal Models for Texture-Based Video Coding," Visual Communications and Image Processing, 10 pages, XP030081081, 2007.
Janez Zaletelj et al., "Video Object Extraction and Shape Coding Using B-Splines," 2000 10th European Signal Processing Conference, IEEE, pp. 1-4, XP032755966, 2000.
Wei Chen et al., "Parametric model for video content analysis," Pattern Recognition Letters, vol. 29, No. 3, pp. 181-191, XP028916558, 2007.
Yongbin Shen et al., "A Novel Method for Video Retrieval Using Relevant Feedback," 2009 International Conference on New Trends in Information and Service Science, IEEE, XP031531237, pp. 542-545, 2009.
Mary L. Comer et al., "Segmentation of Textured Images Using a Multiresolution Gaussian Autoregressive Model," IEEE Transactions on Image Processing, vol. 8, No. 3, pp. 408-420, XP011026283, 1999.
Buades, Antoni, et al., "Cartoon+Texture Image Decomposition", Image Processing On Line 1, 2011, pp. 200-207.
Elad, M., et al., "Simultaneous cartoon and texture image inpainting using morphological component analysis (MCA)", Elsevier Inc., 2005.
Laffont, Pierre-Yves, et al., "Rich Intrinsic Image Decomposition of Outdoor Scenes from Multiple Views", IEEE Transactions on Visualization and Computer Graphics, vol. xx, No. x, 2012, pp. 1-16.
Bull, David R., Zhang, Fan, "A Parametric Framework for Video Compression Using Region-Based Texture Models," IEEE Journal of Selected Topics in Signal Processing, vol. 5, No. 7, pp. 1378-1392, Nov. 2011, pp. 1-15.
Selinger, Peter, POTRACE: a polygon-based tracing algorithm, Sep. 20, 2003, pp. 1-16.
Patterson, J. W., et al., "Constructing and Rendering Vectorised Photographic Images", The Journal of Virtual Reality and Broadcasting, vol. 9, 2012, No. 3.
Orzan, Alexandrina, et al., "Diffusion Curves: A Vector Representation for Smooth-Shaded Images", ACM Transactions on Graphics, vol. 27, No. 3 Article 92, Aug. 2008, pp. 92:1-92:8.
Orzan, Alexandrina, et al., "Structure-preserving manipulation of photographs", International Symposium on Non-Photorealistic Animation and Rendering (NPAR), Aug. 2007.

ENCODER, DECODER, SYSTEM AND METHODS FOR VIDEO CODING

FIELD OF THE INVENTION

The field of the invention relates to video coding. Particular embodiments relate to an encoder for encoding a video signal, a decoder for decoding an encoded video signal, a system for encoding a video signal and decoding an encoded video signal, methods for encoding a video signal and/or decoding an encoded video signal, and a computer program product for encoding a video signal and/or decoding an encoded video signal.

BACKGROUND

Over the last decade a multitude of screen surfaces with different resolutions have emerged. Also, some viewing devices have broadband access, while others have limited access. Those two properties don't always correlate. To serve this heterogeneous group of devices with the same content over a limiting network, scalable video codecs have focused on offering quality layers, generally based on resolution. The base layer comprises the low frequencies, suitable for small screens, and each quality layer adds more and higher frequency components. A device with a small screen only requires a base layer, while larger screens need more quality layers, and hence, more bandwidth.

This approach does not benefit devices with large screens and limited bandwidth. Scalable video codec's base layers are not suited for large screens. They make the video look blurry, due to the low frequency aspect. The human perception of quality does not only look at resolution. We perceive 'simplified', but high frequent versions of an image better than blurry, 'complex' versions, e.g. as in cartoons. Although almost all texture information is lost, sharp edges are kept. A cartoon still looks like an appealing version of reality— much more so than a blurred video with the same amount of bits (in the information-theoretical sense).

SUMMARY

It is an object of embodiments of the present invention to reduce storage and transmission requirements for storing and transmitting encoded video signals.

A related object for some embodiments of the present invention is compressing an image more according to MOS (Mean Opinion Score) rather than PSNR (Peak Signal-to-Noise Ratio). The MPEG-family (Motion Pictures Expert Group) of encoders have reached the point where any more substantial compression results in highly visible artefacts. In contrast, it is an object of some embodiments of the invention to result in less visually disturbing artefacts if limited bandwidth enforces an encoder to transmit degraded video, or when a transmission error occurs.

According to a first aspect of the invention, there is provided an encoder for encoding a video signal, comprising a video modelling module, a video segmentation module, and a vectorisation module. The video modelling module is configured for determining a plurality of video modelling parameters for a plurality of video locations on a spatiotemporal grid (and thus discrete) of the video signal, the spatiotemporal grid comprising at least two spatial dimensions and a time dimension, each video modelling parameter being adapted for allowing a pre-determined video model to at least approximately reconstruct its video location. The video segmentation module is configured for segmenting the video signal into a plurality of spatiotemporal video regions (i.e. spatiotemporal spaces comprising clustered voxels), based on the determined plurality of video modelling parameters. The vectorisation module is configured for vectorising spatiotemporal surfaces of the plurality of spatiotemporal video regions. The encoder is configured for encoding the video signal based on at least a subset of the determined plurality of video modelling parameters and based on the vectorised spatiotemporal surfaces. The subset is determined taking into account the plurality of spatiotemporal video regions.

In this manner, by encoding the video signal on the basis of the vectorised spatiotemporal surfaces and at least a subset of the determined plurality of video modelling parameters, video signals can be encoded (i.e. compressed and represented) efficiently, and hence requirements for storage and transmission can be reduced. In particular, by encoding the video signal based on the vectorised spatiotemporal surfaces of the video regions, and based on a subset (i.e. at least some) of the determined plurality of video modelling parameters, the encoder allows encoding video signals in line with MOS (Mean Opinion Score) rather than with PSNR (Peak Signal-to-Noise Ratio). Consequently, if limited bandwidth enforces an encoder to transmit degraded video, or also if a transmission error occurs, there is less likelihood of a visually disturbing artefact occurring.

In the context of the present specification, 'video modelling' should be taken to mean 'modelling a video signal in a computational manner'.

In a particular embodiment, the video modelling module is configured for selecting a sparse subset of all video locations on the spatiotemporal grid of the video signal, and for determining the plurality of video modelling parameters for the selected sparse subset. In a further particular embodiment, the plurality of video locations is selected randomly. In another particular embodiment, the plurality of video locations is selected using a heuristic.

In this manner, the plurality of video locations can be covered more efficiently.

It is a further object of some embodiments of the present invention to serve different devices from a single video representation using quality layers, where the quality range corresponds to our human perception of 'simplified' to more 'detailed' versions of the content.

In an embodiment, the vectorisation module is configured for vectorising the spatiotemporal surfaces in a cascaded manner by iteratively determining vectorising parameters for fitting the spatiotemporal surfaces to a varying degree of accuracy, in order to determine a plurality of layers. The plurality of layers has at least a first layer and a second layer. The first layer comprises a first number of the iteratively determined vectorising parameters for fitting the spatiotemporal surfaces to a first degree of accuracy. The second layer comprises a second number of the iteratively determined vectorising parameters for fitting the spatiotemporal surfaces to a second degree of accuracy. The second degree of accuracy more closely fits the spatiotemporal surfaces than the first degree of accuracy, according to a pre-determined fitting similarity metric. The encoder is configured for encoding the video signal based on the determined plurality of layers.

It will be appreciated by the skilled person that it is well-understood how to vary a degree of accuracy when fitting surfaces (or curves), in order to fit surfaces (or curves) less or more closely. In a particular further developed embodiment, the iteration is performed by successively restricting an error bound parameter to be satisfied by all vectorised spatiotemporal surfaces of a given iteration run.

In this manner, the encoder embodiment can cater to different devices that are served from a single video representation using layers (thus serving as quality layers), even when the device has a large resolution and a low bandwidth, since the embodiment allows for decoding the video signal to a satisfactory result, even based on the base layer or base layers of those quality layers.

In another embodiment, the video segmentation module is configured for segmenting the video signal in a cascaded manner by iteratively determining segmentation parameters for partitioning the video signal into a plurality of spatiotemporal video regions to a varying degree of internal coherence, in order to determine a plurality of layers. The plurality of layers has at least a first layer and a second layer. The first layer comprises a first number of the iteratively determined segmentation parameters for partitioning the video signal to a first degree of internal coherence. The second layer comprises a second number of the iteratively determined segmentation parameters for partitioning the video signal to a second degree of internal coherence. The second degree of internal coherence partitions the video signal into a plurality of spatiotemporal video regions with greater internal coherence than the first degree of internal coherence, according to a pre-determined partitioning similarity metric. The encoder is configured for encoding the video signal based on the determined plurality of layers.

It will be appreciated by the skilled person that it is well-understood how to vary a degree of internal coherence when partitioning segments, in order to partition segments to less or more internal coherence.

In particular, the above embodiment wherein the video segmentation module is configured for segmenting the video signal in a cascaded manner may advantageously be combined with the embodiment wherein the vectorisation module is configured for vectorising the spatiotemporal surfaces in a cascaded manner.

In a particular embodiment, the spatiotemporal surfaces are vectorised by fitting spatiotemporal surfaces of the plurality of spatiotemporal video regions by determining a number of control points, using a vectorisation algorithm, such as at least one of the following: a three-dimensional Bezier surface fitting algorithm; linear patches; splines; and NURBS (non-uniform rational basis splines). In another embodiment, the vectorisation algorithm uses implicit functions.

In a preferred embodiment, the video modelling module is configured for determining the plurality of video modelling parameters for a pre-determined video model encoding a stochastic process adapted for at least approximately reconstructing the video location stochastically.

In this manner, it is possible to encode a limited amount of information and trust that a decoder will be able to at least approximately reconstruct the encoded video signal, using the pre-determined video model and its own instantiation of the stochastic process, by letting the stochastic process reconstruct the appearance of the video location in an approximate manner but in line with MOS.

In a further developed embodiment, the video modelling module is configured for determining the plurality of video modelling parameters for a dynamic texture model. The video segmentation module is configured for segmenting the video signal into the plurality of spatiotemporal video regions by grouping at least two of the plurality of dynamic texture model parameters, based on correspondence between respective dynamic texture model parameters thereof, according to a pre-determined distance metric. Also, the encoder is configured for encoding the video signal based on at least a subset of the determined plurality of dynamic texture model parameters, according to the grouping.

Dynamic texture models are stochastic or probabilistic models for predicting portions of video, that can be used for successive portions (e.g. parts of video frames) of images or other sequences of imagery (e.g. whole video frames) that have certain spatially invariant properties (such that they look similar visually and statistically over the spatial dimensions of the image, such as a video frame) and that have temporal coherence (i.e. the transition from a portion of an image at time t to its subsequent time t' or to its preceding time t" is 'smooth' in that it can potentially accord with a flow from t" to t or from t to t'). In other words, a successive portion of an image is typically dependent on its preceding portion. Dynamic texture models may typically be represented by an auto-regressive, moving average (ARMA) process. They may for example be determined by modelling a stationary, linear Markov process in a low-dimensional space embedding a number of base patches. Dynamic texture models are further defined in Soatto, S., Doretto, G., & Wu, Y. N. (2001); Dynamic textures; in *Proceedings on the Eighth IEEE International Conference on Computer Vision, 2001* (Vol. 2, pp. 439-446), IEEE.

In a first exemplary embodiment, the grouping comprises clustering, using one or more of the following techniques: K-means clustering, mean-shift clustering, split-and-merge clustering, or region-growing techniques. In a second exemplary embodiment, the grouping comprises graph-based segmentation, using one or more of the following techniques: minimum cuts segmentation, normalised-cut segmentation, or other (preferably efficient) graph-based image and/or video segmentation techniques. The skilled person will understand that supervoxel-related techniques may be applied. In a preferred embodiment, the grouping comprises scoring the video models according to a similarity metric or (equivalently) according to a distance metric (e.g. a pre-determined distance metric, such as the Kullback-Leibler divergence metric) in order to group similar video models. In a particular further developed embodiment, the grouping comprises evaluating a similarity (or equivalently a distance) metric between all respective pairs of the dynamic texture models. The similarity (or distance) may be measured for colours, for (dynamic) textures, for gradients, etc.

In a preferred embodiment, the encoder is configured for adding the subset of the determined video modelling parameters to a dictionary (i.e. an associative data structure that can be stored in a computer memory), and the encoder is configured for encoding the video signal based on references to the subset in the dictionary. Further, the encoder is adapted to provide access to the dictionary to a decoder for decoding the encoded video signal.

In this manner, the transmission and storage requirements can be further improved, by delegating a part of the data of the encoded video signal to the dictionary.

According to another aspect of the invention, there is provided a decoder for decoding a video signal, comprising a rasterising module, a propagation module, and an instantiation module. The encoder is configured for obtaining a plurality of video modelling parameters and a plurality of vectorised (thus continuous) spatiotemporal surfaces, based on the encoded video signal, each vectorised spatiotemporal surface being represented in a continuous spatiotemporal domain comprising at least two spatial dimensions and a time dimension, each video modelling parameter being adapted for allowing a pre-determined video model to at least approximately reconstruct a discrete video location of the encoded video signal. The rasterising module is configured for rasterising the plurality of video modelling parameters and the plurality of vectorised spatiotemporal surfaces onto a discrete spatiotemporal grid comprising at least two spatial dimensions and a time dimension. The propagation module is configured for propagating the plurality of video modelling parameters over the discrete spatiotemporal grid, taking into account the rasterised plurality of vectorised spatiotemporal surfaces. The instantation module is configured for instantiating the pre-determined video model using the propagated plurality of video modelling parameters on the discrete spatiotemporal grid.

In the context of the present specification, 'rasterising' should be taken to mean 'transforming or mapping an object from a continuous domain to a discrete grid'. In other words, a discrete grid is imposed over the extent of the continuous domain. For the sake of completeness, it is noted that rasterising generally may refer to the task of taking an image or video described in a vector graphics format and converting it into a raster image format (or a series of raster images) for further video processing, for output on a video display or printer, or for storage in a bitmap file format.

The skilled person will understand that the hereinabove described considerations and advantages also apply for embodiments of the decoder, mutatis mutandis.

In a preferred embodiment, the encoded video signal comprises a plurality of layers, and the decoder is configured for selecting at least one layer from the plurality of layers of the video signal, in order to obtain the plurality of video modelling parameters and the plurality of vectorised spatiotemporal surfaces from the selected at least one layer. For the sake of clarity, it is noted that 'selecting' is here construed to mean that only the at least one layer that is selected from the plurality of layers is further used in the corresponding preferred embodiment.

In a further developed embodiment, the selecting is performed by comparing pre-defined profiles against bandwidth limitations and/or screen resolution, by learning the relation between these and the number of layers, and/or by letting a user increase or decrease quality and hence control bandwidth. In a preferred further developed embodiment, the selecting is dynamic and is open for renegotiation as conditions change.

In a preferred embodiment, the instantation module is configured for instantiating a pre-determined video model encoding a stochastic process adapted for at least approximately reconstructing the discrete video location stochastically, based on at least one of the propagated plurality of video modelling parameters, using the propagated plurality of video modelling parameters.

In a further developed embodiment, the plurality of video modelling parameters are dynamic texture model parameters. The pre-determined video model is a dynamic texture model, and the instantation module is configured for instantiating the dynamic texture model, using the plurality of dynamic texture model parameters.

In another preferred embodiment, the decoder is configured for obtaining access to a dictionary comprising a plurality of video modelling parameters, and the instantation module is configured for the instantiating based on the plurality of video modelling parameters in the dictionary.

In an embodiment, the propagation module is configured for at least one of the following, for performing the propagating: labelled belief propagation of the plurality of video modelling parameters; graph cutting the plurality of video modelling parameters; and performing variational methods on the plurality of video modelling parameters. The skilled person understands that other techniques for energy minimisation may also be applicable.

According to another aspect of the invention, there is provided a system for encoding a video signal and decoding an encoded video signal, comprising: an encoder according to any one of the embodiments disclosed hereinabove; and a decoder according to any one of the embodiments disclosed hereinabove. The skilled person will understand that the hereinabove described considerations and advantages also apply for embodiments of the system, mutatis mutandis.

According to another aspect of the invention, there is provided a method for encoding a video signal, comprising at a computing device: determining a plurality of video modelling parameters for a plurality of video locations on a spatiotemporal grid of the video signal, the spatiotemporal grid comprising at least two spatial dimensions and a time dimension, each video modelling parameter being adapted for allowing a pre-determined video model to at least approximately reconstruct its video location (i.e. the video location associated with that video modelling parameter—note that one video location, such as preferably a pixel, or a corner of a given type, or a line of a given orientation, etc., may be associated with one or more video modelling parameters); segmenting the video signal into a plurality of spatiotemporal video regions, based on said determined plurality of video modelling parameters; vectorising spatiotemporal surfaces of the plurality of spatiotemporal video regions; and encoding the video signal based on at least a subset of the determined plurality of video modelling parameters and based on the vectorised spatiotemporal surfaces, wherein the subset is determined taking into account the plurality of spatiotemporal video regions. The skilled person will understand that the hereinabove described considerations and advantages also apply for embodiments of this method, mutatis mutandis.

According to another aspect of the invention, there is provided a method for decoding an encoded video signal, comprising at a computing device: obtaining a plurality of video modelling parameters and a plurality of vectorised spatiotemporal surfaces, based on the encoded video signal, each vectorised spatiotemporal surface being represented in a continuous spatiotemporal domain comprising at least two spatial dimensions and a time dimension, each video modelling parameter being adapted for allowing a pre-determined video model to at least approximately reconstruct a discrete video location of the encoded video signal; rasterising the plurality of video modelling parameters and the plurality of vectorised spatiotemporal surfaces onto a discrete spatiotemporal grid comprising at least two spatial dimensions and a time dimension; propagating said plurality of video modelling parameters over said discrete spatiotemporal grid, taking into account (i.e. being constrained by) the rasterised plurality of vectorised spatiotemporal surfaces. The skilled person will understand that the hereinabove described considerations and advantages also apply for embodiments of this method, mutatis mutandis.

According to another aspect of the invention, there is provided a method for encoding a video signal and decoding an encoded video signal, comprising all of the steps of a method for encoding a video signal according to any one of the embodiments disclosed hereinabove, and all of the steps of a method for decoding an encoded video signal according to any one of the embodiments disclosed hereinabove. The skilled person will understand that the hereinabove described considerations and advantages also apply for embodiments of this method, mutatis mutandis.

According to another aspect of the invention, there is provided a computer program product comprising computer-executable instructions for performing a method when the program is run on a computer, the method comprising the steps of any one of the methods described hereinabove. The skilled person will understand that the hereinabove described considerations and advantages also apply for embodiments of the computer program product, mutatis mutandis.

According to a further aspect of the invention, there is provided a computer program product comprising computer-executable instructions to perform, when the program is run on a computer, the steps of embodiments of any one of the methods disclosed hereinabove. The reference to computer-executable instruction has to be construed such that it comprises both directly executable machine code, code that must be compiled to be executed, and code that is interpreted instead of executed per se.

According to a further aspect of the invention, there is provided a digital data storage medium encoding a machine-executable program of instructions to perform the steps of any one of the embodiments of the methods disclosed hereinabove.

According to a further aspect of the invention, there is provided a computer program comprising computer-executable instructions to perform, when the program is run on a computer, one or more steps of embodiments of the method disclosed above. According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments according to the present invention. The above and other advantages of the features of embodiments according to the invention and objects of the invention will become more apparent and the invention will be better understood from the following detailed description when read in conjunction with the accompanying drawings, in which.

DESCRIPTION OF EMBODIMENTS

Figure 1:
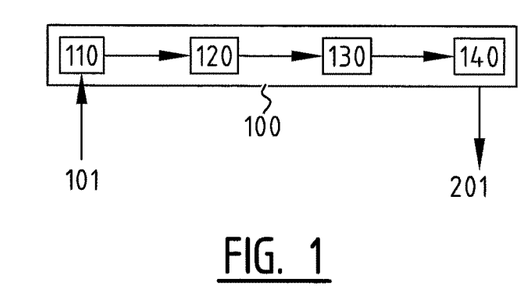
FIG. 1 illustrates schematically an embodiment of an encoder according to the present invention.

FIG. 1 illustrates schematically an embodiment of an encoder 100 according to the present invention. The encoder 100 comprises an optional input module 110, a video modelling module 120, a video segmentation module 130, and a vectorisation module 140. The input module 110 is configured for obtaining the input video signal 101, which is to be encoded as encoded video signal 201. The input module 110 is optional in that the input video signal 101 may be directly provided to the video modelling module 120.

The video modelling module 120 determines a plurality of video modelling parameters for a plurality of video locations (for example, pixels, or other salient image elements, such as specific image corners or oriented lines) on a spatiotemporal grid of said video signal 101, said spatiotemporal grid comprising at least two spatial dimensions and a time dimension, each video modelling parameter being adapted for allowing a pre-determined video model to at least approximately reconstruct its video location. The video segmentation module 130 segments said video signal 101 into a plurality of spatiotemporal video regions, based on the determined plurality of video modelling parameters (for example, by segmenting video locations together whose video modelling parameters show sufficient similarity). The vectorisation module 140 vectorises spatiotemporal surfaces of said plurality of spatiotemporal video regions. The encoder encodes said video signal as encoded video signal 201, based on at least a subset of said determined plurality of video modelling parameters and on said vectorised spatiotemporal surfaces. The subset is determined taking into account the plurality of spatiotemporal video regions, for example by selecting only one or more video modelling parameters for each spatiotemporal video region.

Example video-models may include but are not limited to linear dynamical models, such as first-order ARMA (autoregressive moving average) models with white zero-mean IID (independent and identically distributed) Gaussian input. Corresponding video modelling parameters for a given video location may then for example comprise a transition matrix and an optimal basis. The skilled person will understand that other video modelling parameters can be considered, in order to model a given video location, using a pre-determined video model.

Figure 2:
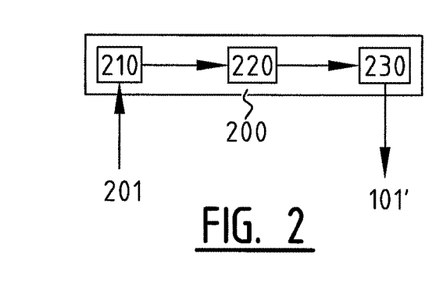
FIG. 2 illustrates schematically an embodiment of a decoder according to the present invention.

FIG. 2 illustrates schematically an embodiment of a decoder 200 according to the present invention. The decoder 300 comprises an rasterising module 210, a propagation module 220, and an instantiation module 230.

The encoder 200 is configured for obtaining a plurality of video modelling parameters and a plurality of vectorised spatiotemporal surfaces, based on an encoded video signal 201 (either directly from the encoded video signal 201, or—if the encoded video signal 201 comprises references to parameters stored elsewhere—by dereferencing the references in the encoded video signal 201), each vectorised spatiotemporal surface being represented in a continuous spatiotemporal domain comprising at least two spatial dimensions and a time dimension, each video modelling parameter being adapted for allowing a pre-determined (preferably agreed upon by both the encoder that was used to encode encoded video signal 201 and decoder 200) video model to at least approximately reconstruct a discrete video location of said encoded video signal 201 (i.e. a video location on a grid of the original video signal). The rasterising module 210 rasterises said plurality of video modelling parameters and said plurality of vectorised spatiotemporal surfaces onto a discrete spatiotemporal grid comprising at least two spatial dimensions and a time dimension. The propagation module 220 propagates said plurality of video modelling parameters over the discrete spatiotemporal grid, constrained by said plurality of vectorised spatiotemporal surfaces. The instantiation module 230 instantiates the pre-determined video model, using the propagated plurality of video modelling parameters on the discrete spatiotemporal grid, thereby producing reconstructed video signal 101'. The instantiation may comprise plugging the video modelling parameter or parameters into the pre-determined video model for a given video location, and using the output as the reconstructed appearance of that video location.

Figure 3:
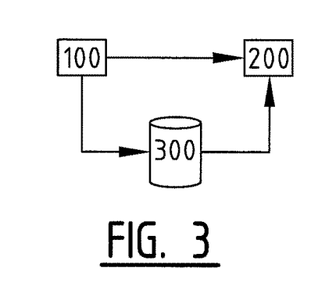
FIG. 3 illustrates schematically an embodiment of a system according to the present invention.

FIG. 3 illustrates schematically an embodiment of a system according to the present invention. The system comprises an encoder 100, e.g. like the encoder 100 of FIG. 1, and a decoder 200, e.g. like the decoder 200 of FIG. 2. The particular system embodiment illustrated here also comprises a dictionary 300 stored in some computer memory storage that is accessible to/from both the encoder 100 and the decoder 200—in other words, the encoder 100 has been adapted to provide access to said dictionary 300 to the decoder 200. In the embodiment illustrated here, the encoder 100 is configured for adding said at least said subset of said determined plurality of video modelling parameters to the dictionary 300. The encoder 100 is also configured for encoding said video signal 101 based on references to the subset in said dictionary 300. The encoder 100 may then encode the video signal by including those references in the encoded video signal 201.

Figure 4:
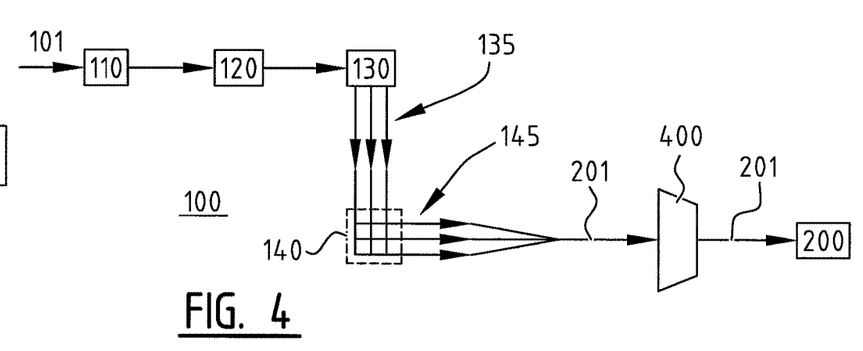
FIG. 4 illustrates schematically another embodiment of a system according to the present invention.

FIG. 4 illustrates schematically another embodiment of a system according to the present invention. The system comprises an encoder 100, e.g. like the encoder 100 of FIG. 1, and a decoder 200, e.g. like the decoder 200 of FIG. 2. Further, FIG. 4 also illustrates how encoded video signal 201 can be provided from the encoder 100 to the decoder 200, via a schematically represented layer selection stage 400 representing the selection by the decoder 200 of one or more layers of the multi-layered (thus scalable) encoded video signal 201.

The particular encoder 100 illustrated here corresponds to the encoder 100 shown in FIG. 1, but with the addition that the video segmentation module 130 is configured for segmenting the video signal 101 in a cascaded manner by iteratively determining segmentation parameters for partitioning said video signal into a plurality of spatiotemporal video regions to a varying degree of internal coherence, in order to determine a plurality of layers 135. The plurality of layers 135 has at least a first layer and a second layer. The first layer comprises a first number of said iteratively determined segmentation parameters for partitioning said video signal to a first degree of internal coherence. The second layer comprises a second number of said iteratively determined segmentation parameters for partitioning said video signal to a second degree of internal coherence. The second degree of internal coherence partitions said video signal into a plurality of spatiotemporal video regions with greater internal coherence than said first degree of internal coherence, according to a pre-determined partitioning similarity metric. Further, the encoder 100 is configured for encoding said video signal 101 as encoded video signal 201, based on said determined plurality of layers 135.

The particular encoder 100 illustrated here further has the addition (which is shown here combined with the addition described above, but either of which could be provided separately and independently from the other addition) that the vectorisation module 140 is configured for vectorising the spatiotemporal surfaces in a cascaded manner by iteratively determining vectorising parameters for fitting the spatiotemporal surfaces to a varying degree of accuracy, in order to determine a plurality of layers 145. The plurality of layers 145 has at least a first layer and a second layer. The first layer comprises a first number of said iteratively determined vectorising parameters for fitting said spatiotemporal surfaces to a first degree of accuracy. The second layer comprises a second number of said iteratively determined vectorising parameters for fitting said spatiotemporal surfaces to a second degree of accuracy. The second degree of accuracy more closely fits said spatiotemporal surfaces than said first degree of accuracy, according to a pre-determined fitting similarity metric. The encoder 100 is also configured for encoding said video signal 101 as encoded video signal 201, based on said determined plurality of layers 145.

By operating in a cascaded manner, the video segmentation module 130 produces (in this case) three (but in general at least one) layer(s) 135 of successively more fine-grained video regions. By (also) operating in a cascaded manner, the vectorisation module 140 produces (in this case also) three (but in general at least one) layer(s) 145 of successively more closely-fitted spatiotemporal surfaces. In this embodiment, the cascaded vectorisation on top of the cascaded segmentation results in a layered representation of potentially nine layers. The parameters setting the thresholds in all stages of both the segmentation algorithm and the vectorisation algorithm tune which parts of the representation end up in which layer.

In another exemplary embodiment the dynamic texture content of the video signal is analysed and clustered as spatiotemporal video regions in order to trace segment contours (i.e. surfaces of the spatiotemporal video regions) afterwards. Dynamic textures may be modelled by a stationary, linear Markov process in a low-dimensional space in which some base patches are embedded. There is a closed-form solution to finding an optimal basis and model matrices under certain assumptions. Also, instances of similar dynamic textures are close (in e.g. the Kullback-Leibler divergence metric sense). This means that if many video regions in the video signal are modelled as such, they can be clustered by evaluating this distance metric.

For this exemplary embodiment, the encoder learns to learn dynamic texture models at (sparsely, and/or randomly or heuristically) selected video locations in the video signal, on a spatiotemporal grid. A divergence metric, such as the Kullback-Leibler distance, is then evaluated between all pairs of the models, and they are clustered accordingly. Next, it is attempted to explain away patches at every pixel by those clustered models and each pixel is scored against each model. Finally, all those pixels that could be well explained by the same models are spatiotemporally clustered. This can e.g. be done by finding minimum cuts (mincuts), where a cut is actually a surface, separating three-dimensional regions of distinct texture. This procedure again can be iterated in a cascaded manner The first iterations will find the most important cuts, while latter iterations find more detailed ones.

These mincut surfaces are still rasterized binary maps. These surfaces are vectorised, e.g. by a 3D Bezier surface fitting algorithm. This may e.g. be a non-trivial extension of the 2D Ramer-Douglas-Peucker algorithm by adding a temporal axis. The algorithm may have a parameter v that acts as an error bound. Decreasing this parameter will yield more keypoints in the vectorised representation to get the more accurate approximation. The algorithm is run for each set of detected contours and again, it may also be run in cascade with decreasing parameter tunings to retrieve increasing levels of detail. For each edge set i (columns in the case of FIG. 4) and each output layer j (rows in the case of FIG. 4), there is a differently tuned parameter $v_{ij}$. These parameters may even be so restrictive for the base layers (low j) that some of the detailed edges (high i) don't get represented by that layer at all and are fully forwarded to the next layer j+1. It is noted that there is in principle no need to restart the vectorisation algorithm at each stage: the algorithm's iterations can just be continued. The keypoints coming from the most basic stage are then not repeated in subsequent stages.

There are many alternative ways of vectorising surfaces. Related to Bezier surfaces, one could also opt for linear patches, splines, NURBS (non-uniform rational basis splines), etc. All of these use keypoints and local geometry derivatives to describe the contours. A different approach is to define them with implicit functions. These representation are not control point driven, but each implicit function also constrains the surfaces locally. Hence, this is another way of discretizing a continuous function.

As explained, the mincuts define spatiotemporal video regions that can be explained by the same dynamic texture model. A dictionary (like dictionary 300 of FIG. 3) can be created of those detected texture models (or equivalently, of the video modelling parameters) and sent to the decoder. Next, a sparse collection of texture paint seeds (representing video modelling parameters for the dynamic texture model) can be included into the representation. Each seed is associated with a spatiotemporal video location on the video signal's grid and has an identifier indicating which entry of the dictionary 300 should be used—in other words, each seed is a reference to a number of video modelling parameters stored in the dictionary 300. Where to place the seeds, and sorting them by importance, are by-products of the aforementioned segmentation/clustering algorithm. In this example, a selected set of the most important seeds will end up in the base layer, while less important seeds fill additional layers.

The seeds do not necessarily encode the exact instance of the texture, but preferably merely encode a reference to the model. A decoder 200 will be free to instantiate from this model. As mentioned, this model encodes a random process: the choice of initializer and random variables by the decoder will influence the exact appearance of the texture. Since the exact instance is not of paramount importance, but rather the global stochastics of the appearance, this proves to be a compression advantage. It is noted that the reconstruction will evaluate poorly in a PSNR sense, but will evaluate well on perceived quality (Mean Observation Score), because humans cannot perceive the difference. These characterizing stochastics of the appearance of dynamic textures can be rendered at any resolution or frame rate by the decoder.

After selection of the required layers, a propagation module (like propagation module 220 of the decoder 200 of FIG. 2) may first propagate the seeds within the contours set by the vectorised spatiotemporal surfaces. Since the module is not propagating continuous colours, but discrete dictionary entries, it is advantageous to opt e.g. for labelled belief propagation, for GraphCuts or for a variational method, in order to perform energy minimisation. These will densely rasterize the sparse texture seeds on a spatiotemporal grid, taking into account the contours (and, if present, their attributed importance). Next, the instantiation module 230 may instantiate the random processes of the video model or models according to the corresponding entries in the dynamic texture dictionary 300. This results in output video signal 101 for displaying or post-processing.

A person of skill in the art would readily recognize that steps of various above-described methods can be performed by programmed computers. Herein, some embodiments are also intended to cover program storage devices, e.g. digital data storage media, which are machine or computer readable and encode machine-executable or computer-executable programs of instructions, wherein said instructions perform some or all of the steps of said above-described methods. The program storage devices may be, e.g. digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer.

Whilst the principles of the invention have been set out above in connection with specific embodiments, it is to be understood that this description is merely made by way of example and not as a limitation of the scope of protection which is determined by the appended claims.

The invention claimed is:

1. An apparatus comprising:
   at least one processor; and
   at least one memory including computer program code;
   the at least one memory including computer program code configured to, with the at least one processor, cause the apparatus at least to perform:
   determining a plurality of video modelling parameters for a plurality of video locations on a spatiotemporal grid of a video signal, said spatiotemporal grid comprising at least two spatial dimensions and a time dimension, at least one video modelling parameter being configured to allow a pre-determined video model to at least approximately reconstruct its video location;

segmenting said video signal into a plurality of spatiotemporal video regions, based on said determined plurality of video modelling parameters;

vectorising spatiotemporal surfaces of said plurality of spatiotemporal video regions; and encoding said video signal based on at least a subset of said determined plurality of video modelling parameters and based on said vectorised spatiotemporal surfaces, wherein said subset is determined taking into account said plurality of spatiotemporal video regions.

2. The apparatus of claim 1, wherein the at least one memory including computer program code is configured to, with the at least one processor, cause the apparatus at least to further perform vectorising said spatiotemporal surfaces in a cascaded manner by iteratively determining vectorising parameters for fitting said spatiotemporal surfaces to a varying degree of accuracy, in order to determine a plurality of layers, wherein:

a first layer comprises a first number of said iteratively determined vectorising parameters for fitting said spatiotemporal surfaces to a first degree of accuracy; and a second layer comprises a second number of said iteratively determined vectorising parameters for fitting said spatiotemporal surfaces to a second degree of accuracy;

wherein said second degree of accuracy more closely fits said spatiotemporal surfaces than said first degree of accuracy, according to a pre-determined fitting similarity metric; and wherein the at least one memory including computer program code is configured to, with the at least one processor, cause the apparatus at least to further perform encoding said video signal based on said determined plurality of layers.

3. The apparatus of claim 1, wherein the at least one memory including computer program code is configured to, with the at least one processor, cause the apparatus at least to further perform segmenting said video signal in a cascaded manner by iteratively determining segmentation parameters for partitioning said video signal into a plurality of spatiotemporal video regions to a varying degree of internal coherence, in order to determine a plurality of layers, of which plurality of layers:

a first layer comprises a first number of said iteratively determined segmentation parameters for partitioning said video signal to a first degree of internal coherence; and a second layer comprises a second number of said iteratively determined segmentation parameters for partitioning said video signal to a second degree of internal coherence;

wherein said second degree of internal coherence partitions said video signal into a plurality of spatiotemporal video regions with greater internal coherence than said first degree of internal coherence, according to a pre-determined partitioning similarity metric; and wherein the at least one memory including computer program code is configured to, with the at least one processor, cause the apparatus at least to further perform encoding said video signal based on said determined plurality of layers.

4. The apparatus of claim 1, wherein the at least one memory including computer program code is configured to, with the at least one processor, cause the apparatus at least to further perform determining said plurality of video modelling parameters for a pre-determined video model encoding a stochastic process configured to at least approximately reconstruct said video location stochastically.

5. The apparatus of claim 4, wherein the at least one memory including computer program code is configured to, with the at least one processor, cause the apparatus at least to further perform:

determining said plurality of video modelling parameters for a dynamic texture model;

segmenting said video signal into said plurality of spatiotemporal video regions by grouping at least two of said plurality of dynamic texture model parameters, based on correspondence between respective dynamic texture model parameters thereof, according to a pre-determined distance metric;

encoding said video signal based on at least a subset of said determined plurality of dynamic texture model parameters, according to said grouping.

6. The apparatus of claim 4, wherein the at least one memory including computer program code is configured to, with the at least one processor, cause the apparatus at least to further perform:

determining said plurality of video modelling parameters for a dynamic texture model;

segmenting said video signal into said plurality of spatiotemporal video regions by grouping at least two of said plurality of dynamic texture model parameters, the grouping comprising evaluating a similarity or a distance metric between respective pairs of the dynamic texture models, wherein the similarity or distance is measured for colors, dynamic textures, and/or gradients;

encoding said video signal based on at least a subset of said determined plurality of dynamic texture model parameters, according to said grouping.

7. The apparatus of claim 1, wherein the at least one memory including computer program code is configured to, with the at least one processor, cause the apparatus at least to further perform: adding said subset of said determined plurality of video modelling parameters to a dictionary;

encoding said video signal based on references to said subset in said dictionary; and providing access to said dictionary for decoding said encoded video signal.

8. A system comprising the apparatus of claim 1 and another apparatus comprising at least one memory including computer program code is configured to, with the at least one processor, cause the other apparatus at least to perform:

rasterising said plurality of video modelling parameters and said plurality of vectorised spatiotemporal surfaces onto a discrete spatiotemporal grid comprising at least two spatial dimensions and a time dimension;

propagating said plurality of video modelling parameters over said discrete spatiotemporal grid, taking into account said rasterised plurality of vectorised spatiotemporal surfaces; and instantiating said pre-determined video model, using said propagated plurality of video modelling parameters on said discrete spatiotemporal grid.

9. The apparatus of claim 1, wherein the at least one memory including computer program code is configured to, with the at least one processor, cause the apparatus at least to further perform vectorising spatiotemporal surfaces of said plurality of spatiotemporal video regions by fitting spatiotemporal surfaces of the plurality of said spatiotemporal video regions by determining a number of control points, using a vectorisation algorithm, such as at least one of the following: a three-dimensional Bezier surface fitting algorithm; linear patches; splines; and NURBS (non-uniform rational basis splines).

10. An apparatus comprising:
at least one processor; and
at least one memory including computer program code;
the at least one memory including computer program code configured to, with the at least one processor, cause the apparatus at least to perform:
obtaining a plurality of video modelling parameters and a plurality of vectorised spatiotemporal surfaces, based on said encoded video signal, at least one vectorised spatiotemporal surface being represented in a continuous spatiotemporal domain comprising at least two spatial dimensions and a time dimension, at least one video modelling parameter being configured to allow a pre-determined video model to at least approximately reconstruct a discrete video location of said encoded video signal;
rasterising said plurality of video modelling parameters and said plurality of vectorised spatiotemporal surfaces onto a discrete spatiotemporal grid comprising at least two spatial dimensions and a time dimension;
propagating said plurality of video modelling parameters over said discrete spatiotemporal grid, taking into account said rasterised plurality of vectorised spatiotemporal surfaces; and
instantiating said pre-determined video model, using said propagated plurality of video modelling parameters on said discrete spatiotemporal grid.

11. The apparatus of claim 10,
wherein said encoded video signal comprises a plurality of layers; and
wherein the at least one memory including computer program code is configured to, with the at least one processor, cause the apparatus at least to further perform selecting at least one layer from said plurality of layers of said video signal, in order to obtain said plurality of video modelling parameters and said plurality of vectorised spatiotemporal surfaces from said selected at least one layer.

12. The apparatus of claim 10, wherein the at least one memory including computer program code is configured to, with the at least one processor, cause the apparatus at least to further perform instantiating a pre-determined video model encoding a stochastic process configured to at least approximately reconstruct said discrete video location stochastically, based on at least one of said propagated plurality of video modelling parameters, using said propagated plurality of video modelling parameters.

13. The apparatus of claim 12,
wherein said plurality of video modelling parameters are dynamic texture model parameters and wherein said pre-determined video model is a dynamic texture model; and
wherein the at least one memory including computer program code is configured to, with the at least one processor, cause the apparatus at least to further perform instantiating said dynamic texture model, using said plurality of dynamic texture model parameters.

14. The apparatus of claim 10, wherein the at least one memory including computer program code is configured to, with the at least one processor, cause the apparatus at least to further perform:

obtaining access to a dictionary comprising a plurality of video modelling parameters; and
instantiating based on said plurality of video modelling parameters in said dictionary.

15. A method at a computing device comprising:
determining a plurality of video modelling parameters for a plurality of video locations on a spatiotemporal grid of said video signal, said spatiotemporal grid comprising at least two spatial dimensions and a time dimension, at least one video modelling parameter being configured to allow a pre-determined video model to at least approximately reconstruct its video location;
segmenting said video signal into a plurality of spatiotemporal video regions, based on said determined plurality of video modelling parameters;
vectorising spatiotemporal surfaces of said plurality of spatiotemporal video regions; and
encoding said video signal based on at least a subset of said determined plurality of video modelling parameters and on based said vectorised spatiotemporal surfaces, wherein said subset is determined taking into account said plurality of spatiotemporal video regions.

16. A non-transitory computer-usable data medium storing instructions that, when executed by a computer, cause the computer at least to perform the method of claim 15.

17. The method of claim 15, wherein vectorising spatiotemporal surfaces of said plurality of spatiotemporal video regions comprises fitting spatiotemporal surfaces of the plurality of said spatiotemporal video regions by determining a number of control points, using a vectorisation algorithm, such as at least one of the following: a three-dimensional Bezier surface fitting algorithm; linear patches; splines; and NURBS (non-uniform rational basis splines).

18. The method of claim 15, further comprising:
determining said plurality of video modelling parameters for a pre-determined video model encoding a stochastic process configured to at least approximately reconstruct said video location stochastically;
determining said plurality of video modelling parameters for a dynamic texture model;
segmenting said video signal into said plurality of spatiotemporal video regions by grouping at least two of said plurality of dynamic texture model parameters, the grouping comprising evaluating a similarity or a distance metric between respective pairs of the dynamic texture models, wherein the similarity or distance is measured for colors, dynamic textures, and/or gradients;
encoding said video signal based on at least a subset of said determined plurality of dynamic texture model parameters, according to said grouping.

19. A method at a computing device comprising:
obtaining a plurality of video modelling parameters and a plurality of vectorised spatiotemporal surfaces, based on said encoded video signal, at least one vectorised spatiotemporal surface being represented in a continuous spatiotemporal domain comprising at least two spatial dimensions and a time dimension, at least one video modelling parameter being configured to allow a pre-determined video model to at least approximately reconstruct a discrete video location of said encoded video signal;
rasterising said plurality of video modelling parameters and said plurality of vectorised spatiotemporal surfaces onto a discrete spatiotemporal grid comprising at least two spatial dimensions and a time dimension;

propagating said plurality of video modelling parameters over said discrete spatiotemporal grid, taking into account said rasterised plurality of vectorised spatiotemporal surfaces; and instantiating said pre-determined video model, using said propagated plurality of video modelling parameters on said discrete spatiotemporal grid.

20. A non-transitory computer-usable data medium storing instructions that, when executed by a computer, cause the computer to at least to perform the method of claim 19.

* * * * *